(12) United States Patent
Celona et al.

(10) Patent No.: US 9,203,063 B2
(45) Date of Patent: Dec. 1, 2015

(54) BATTERY BOX AND MOUNTING SHOE INTERFACE

(75) Inventors: Marc J. Celona, Dover, NH (US);
Dominic R. Goupil, Kittery, ME (US);
James W. Teetzel, York, ME (US)

(73) Assignee: Wilcox Industries Corp., Newington, NH (US)

( * ) Notice: Subject to any disclaimer, the term of this patent is extended or adjusted under 35 U.S.C. 154(b) by 623 days.

(21) Appl. No.: 13/103,439

(22) Filed: May 9, 2011

(65) Prior Publication Data

US 2012/0006719 A1   Jan. 12, 2012

Related U.S. Application Data

(60) Provisional application No. 61/332,225, filed on May 7, 2010.

(51) Int. Cl.
*H01M 6/42* (2006.01)
*H01M 2/10* (2006.01)

(52) U.S. Cl.
CPC ............ *H01M 2/1022* (2013.01); *H01M 2/105* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 5,096,788 A * | 3/1992 | Bresin et al. | | 429/99 |
| 5,683,831 A * | 11/1997 | Baril et al. | | 429/96 |
| 5,853,915 A * | 12/1998 | Suto | | 429/99 |
| 6,448,742 B1 * | 9/2002 | Waterman et al. | | 320/114 |
| 6,743,545 B2 * | 6/2004 | Huang | | 429/96 |
| 2003/0027039 A1* | 2/2003 | Benson et al. | | 429/158 |
| 2004/0106036 A1* | 6/2004 | Geis et al. | | 429/99 |
| 2004/0219422 A1* | 11/2004 | Hauck et al. | | 429/96 |
| 2006/0201558 A1* | 9/2006 | Marty et al. | | 137/613 |
| 2008/0084181 A1* | 4/2008 | Griffin | | 320/114 |
| 2008/0169788 A1* | 7/2008 | Bobbin et al. | | 320/135 |

\* cited by examiner

*Primary Examiner* — Patrick Ryan
*Assistant Examiner* — Jose Colucci Rios
(74) *Attorney, Agent, or Firm* — McLane, Middleton, Professional Association (57) ABSTRACT

A battery box apparatus includes a main body defining a battery cavity for removably receiving one or more batteries, the main body having a mounting shoe attached to a first side of the main body for removably mounting the battery box. The battery box also includes a cover movable between a closed position and an open position hingedly connected to the main body to selectively close the battery cavity when the cover is in the closed position and to provide access to the battery cavity when the cover is in the open position. A locking mechanism secures the cover in the closed position. The battery box also includes a flex circuit received within the battery cavity, the flex circuit comprising a circuit structure carried on a flexible substrate electrically coupling a plurality of terminals within the battery cavity to a plurality of electrical contacts on the mounting shoe.

14 Claims, 10 Drawing Sheets

BATTERY BOX AND MOUNTING SHOE INTERFACE

CROSS-REFERENCE TO RELATED APPLICATION

This application claims the benefit of priority under 35 U.S.C. §119(e) based on U.S. provisional patent application No. 61/332,225, filed May 7, 2010. The aforementioned provisional application is incorporated herein by reference in its entirety.

BACKGROUND

The present disclosure relates to an improved battery box and method for providing electrical power to a device. The battery box herein may advantageously be mounted on a helmet such as a military or tactical field helmet for use with a helmet-mounted device or a helmet mounting system for mounting a device such as a night vision device or other optical or viewing device. However, it will be recognized that the present battery box may be used to supply power to all manner of electronic or electrically operated devices. Without limiting the foregoing, the present battery box may be adapted for direct removable attachment to a device to be powered, or, alternatively, may be adapted for remote attachment to the device to be powered, e.g., via cable, circuit board or other circuit carrying substrate for electrically coupling the battery box to a device to be powered.

In a more limited aspect, a method for supplying power to a device, such as a device attached to a helmet or helmet mounting system from a remote location on the helmet is provided. The improved battery box disclosed herein provides a mounting shoe interface which allows power, ground and/or signal to pass from one device to another through the interface. The mounting shoe interface herein finds utility with the battery box as shown and described herein, however, it will be recognized that the battery pack herein is equally applicable to any type of mounting system which can be used to provide power and/or data or control signal to and from one or more items, wherein the battery pack can readily be connected, disconnected and interchanged. Although the preferred embodiment is depicted wherein the device to be powered is a optical device located on the front portion of a helmet and wherein the battery box is remotely located on the rear portion of the helmet, other applications are contemplated, such as for use with a weapon rail mounting interface, wherein power is supplied from the battery box to one or more devices on the weapon mounting rail via conductors carried on or within the weapon rail interface.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
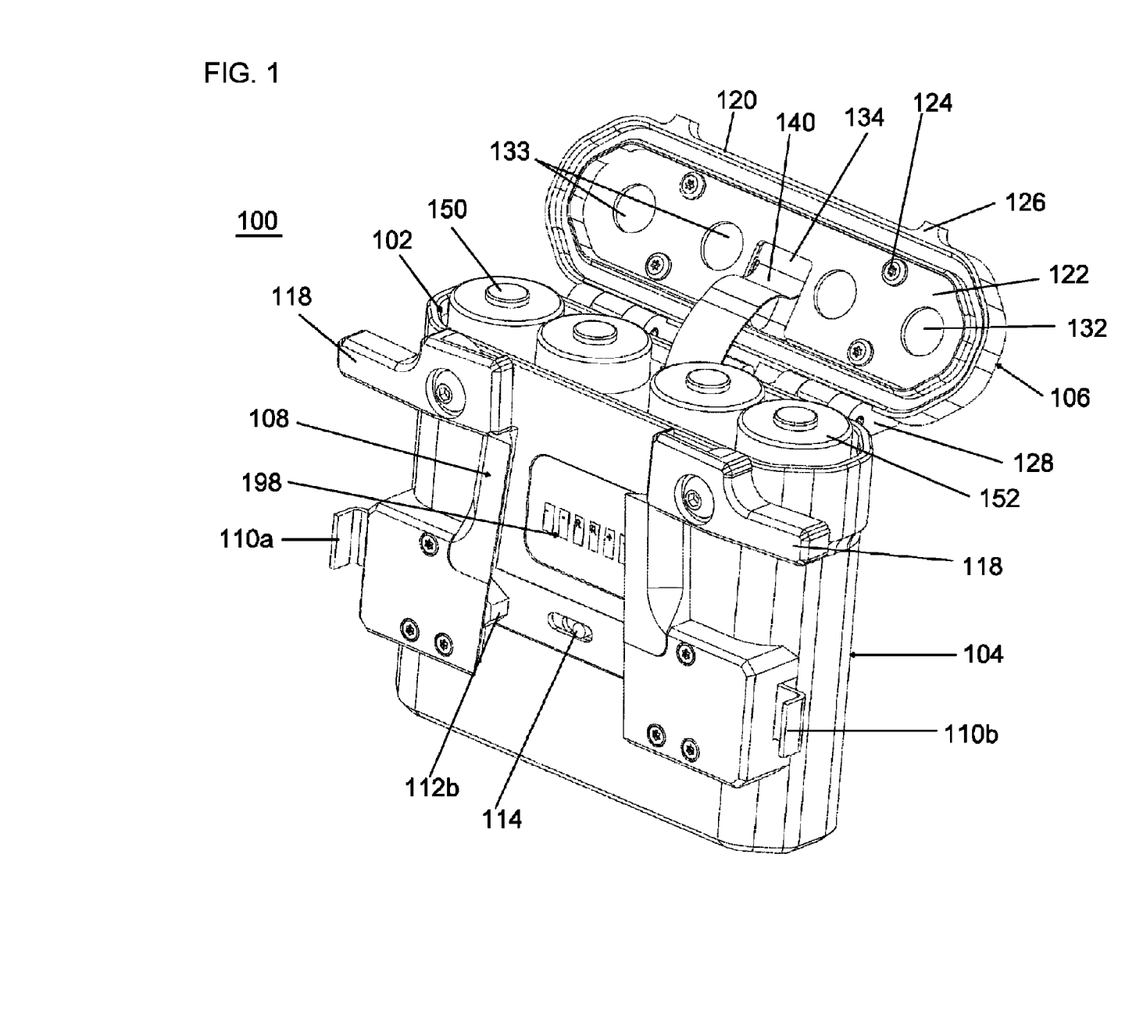
FIG. 1 is an isometric view of the battery box in the opened position according to an exemplary embodiment of the present invention, illustrating the mounting shoe assembly.
Figure 2:
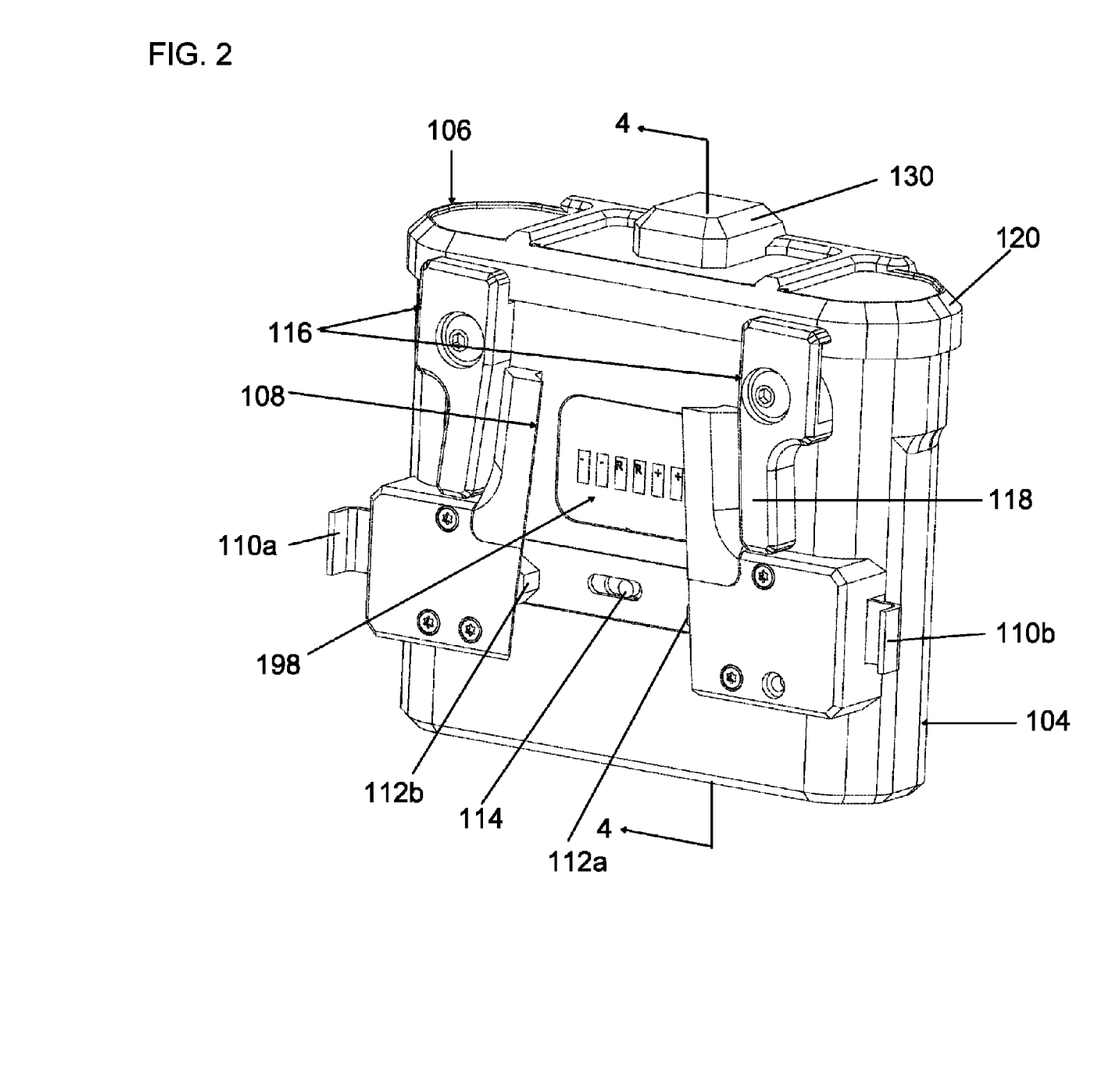
FIG. 2 is an isometric view of the battery box in the closed and locked position, illustrating the mounting shoe assembly.

Referring now to FIGS. 1-10, and with particular reference to FIGS. 1 and 2, there appears an exemplary battery box embodiment 100 of the present invention. The battery box 100 includes a main body 104 and a top or cover 106 defining a housing wherein the top 106 is hingedly connected to the body 104. When top 106 is closed, the body 104 and top 106 together create a cavity 102. The body 104 includes a mounting shoe 108, a locking mechanism 116, and a locking assembly having tabs 110, protrusions 112 and an alignment pin 114. The locking mechanism 116 includes lever locks 118 releasably engaging tabs 126 to secure the top 106 to body 104 in a locked position. The top 106 includes an exterior layer or shell 120 and an insulating layer 122 formed of plastic or other insulating material which are secured together via mechanical fasteners 124, such as screws, rivets, clips, dogs, pawls, or the like. The exterior layer 120 includes the tabs 126, a hinge 128 and a protrusion 130. The insulating layer 122 has apertures 132 and an opening or notch 134.

A plurality of batteries 152 are housed in the cavity 102 of the battery box 100. In the preferred embodiment, each battery 152 is inserted into the cavity 102 in the same direction with respect to polarity, providing ease of use. In the depicted preferred embodiment, the batteries 152 are inserted into the cavity 102 with their negative terminals 154 down leaving the positive terminals 150 to extend through the apertures 132 in the insulating layer 122 and to thereby contact the contact pads 133 disposed in the top 106 when the top 106 is closed and secured to the body 104 via the locking mechanism 116. The top 106 is secured to the body 104 by moving lever locks 118 from the horizontal open position, shown in FIG. 1, to the vertical locked position, shown in FIG. 2. When the lever locks 118 are moved to a vertical locked position they engage tabs 126 securing the top 106 to the body 104 of the battery box 100. When the top 106 is in the closed and locked position the positive terminals 150 extend through the apertures 132 and contact the contact pads 133.

The contact pads 133, in turn, are electrically coupled to a flex circuit 140 which comprises circuit conductors or traces formed on a flexible substrate such as a flexible tape or film material, which may be formed, e.g., of a polymeric material. Commonly, prior art battery pack devices may employ multiple mechanical contacts connecting the battery pack door to the case to send all the positives back down to the negatives. In contrast, the present battery box employs the flex circuit 140 to do the routing, thereby eliminating the need for extra contacts between the door and the housing.

The thickness of the insulating layer 122 and the diameter of the apertures 132 are selected to allow the positive terminals 150 to extend through the apertures 132 when the cover 106 is in the closed position, while preventing passage of the negative battery terminals 154. In this manner, contact will not be made with the circuit 140, thereby preventing incorrect polarity or a short circuit condition in the event one or more of the batteries are inadvertently inserted into the cavity 102 in an inverted orientation. If the batteries 152 are incorrectly inserted a user can reopen the top 106 and fix the incorrectly inserted batteries 152 by disengaging the tabs 126, which is done by moving the lever locks 118 from the vertical locked position to the horizontal open position. A user can also open the top 106 in this manner to replace batteries 152 that have died.

The battery box 100 includes exterior electrical contacts 198 and a mounting shoe 108. The mounting shoe 108 slidably receives a complementary mating mounting foot 109, which may be secured to, e.g., a helmet mounting system, weapon mounting system, or other mounting system. To secure the battery box 100 to the mounting foot 109, the mounting shoe 108 contains a locking assembly having tabs 110a and 110b and protrusions 112a and 112b. The tabs 110a, 110b, and protrusions 112a, 112b, are resiliently biased to engage the mounting foot 109 when the battery box 100 is slid into place. The protrusions 112a and 112b extend into the channel defined by the mounting shoe 108. The protrusion 112a is carried on the sliding tab 110a and the protrusion 112b is carried on the sliding tab 110b such that inward squeezing of the tabs 100a and 110b caused outward movement of the protrusions 112a and 112b, thus allowing removal of the battery box 100 from the mounting foot 109. An alignment pin 114 extends through elongate openings in the tabs 100a and 100b to align the tabs and limit the extent of sliding movement of the tabs 100a and 100b. The mounting shoe 108 and mounting foot 109 may be of tapered, dove-tail configuration. In the depicted embodiment, the foot portion includes angled or ramped edges 111 which engage aligned ramped edges 113a, 113b and the protrusions 112a, 112b, respectively, to urge the protrusions in the transverse outward direction to allow the foot 109 to slide therepast when the battery box is connected to the mounting foot 109. A cross-sectional view illustrating the sliding tabs 110a, 110b and protrusions 112a, 112b appears in FIG. 7.

The battery terminals 150 and 154 are electrically coupled to electrical contacts 198 on mounting shoe 108 via the flex circuit 140. The electrical contacts 198, in turn, contact aligned electrical contacts 188, such as leaf spring contacts, on the mounting foot 109. The contacts 178, in turn are electrically coupled to a device to be operated.

Advantageously, the device to be powered may be an optical device, such as, a monocular or binoculars, a monocular or binocular night vision goggle device, eNVG devices, helmet mounted display screens, head-up displays or any other helmet mounted optical, electro-optical, and/or viewing devices, attached to a helmet mounting system. It will be understood, however, that the battery box herein can be used to provide electrical power to all manner of electrical and electronic devices.

Figure 3:
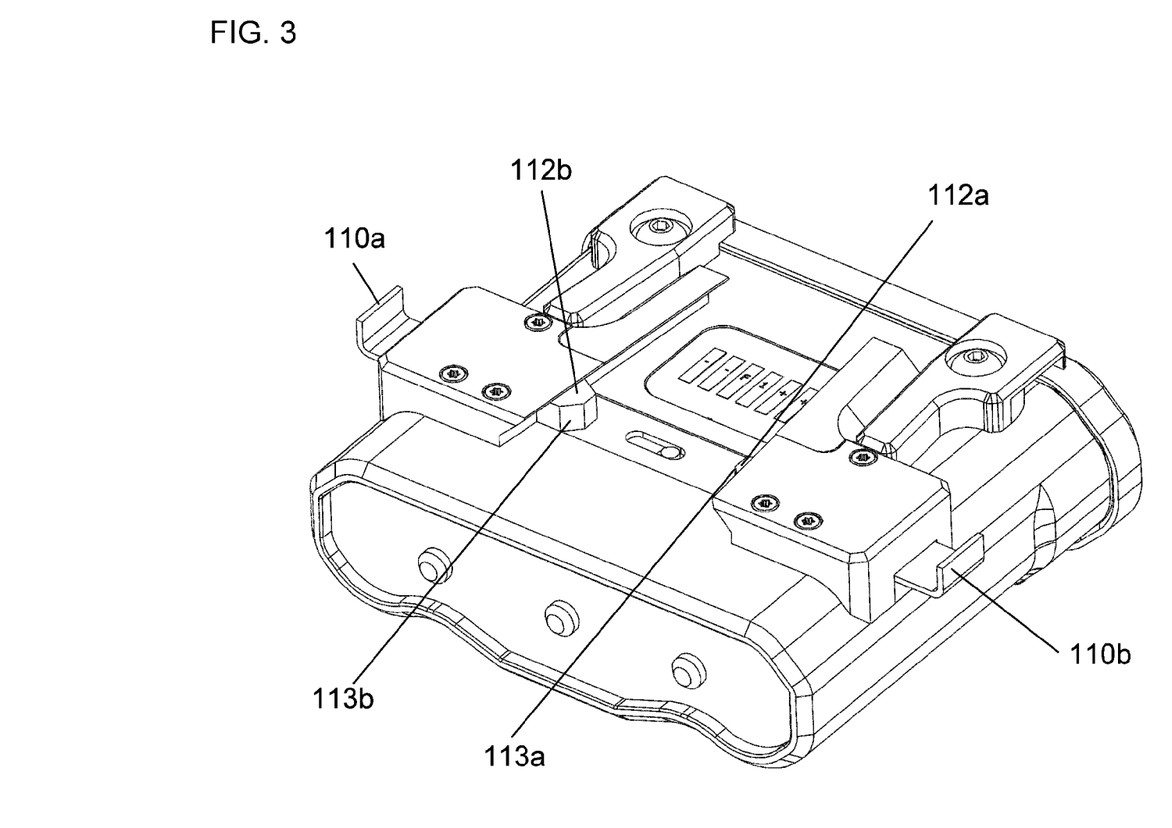
FIG. 3 is an isometric view of the battery box taken generally from the bottom.
Figure 4:
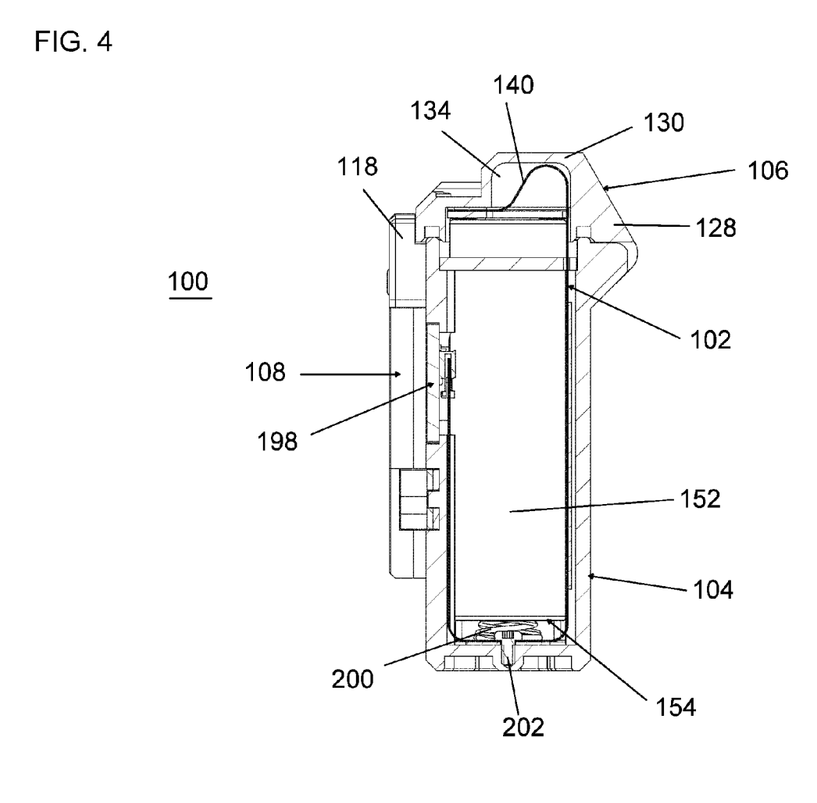
FIG. 4 is a cross-sectional view of the power supply, taken generally along the lines 4-4 appearing in FIG. 2.
Figure 8:
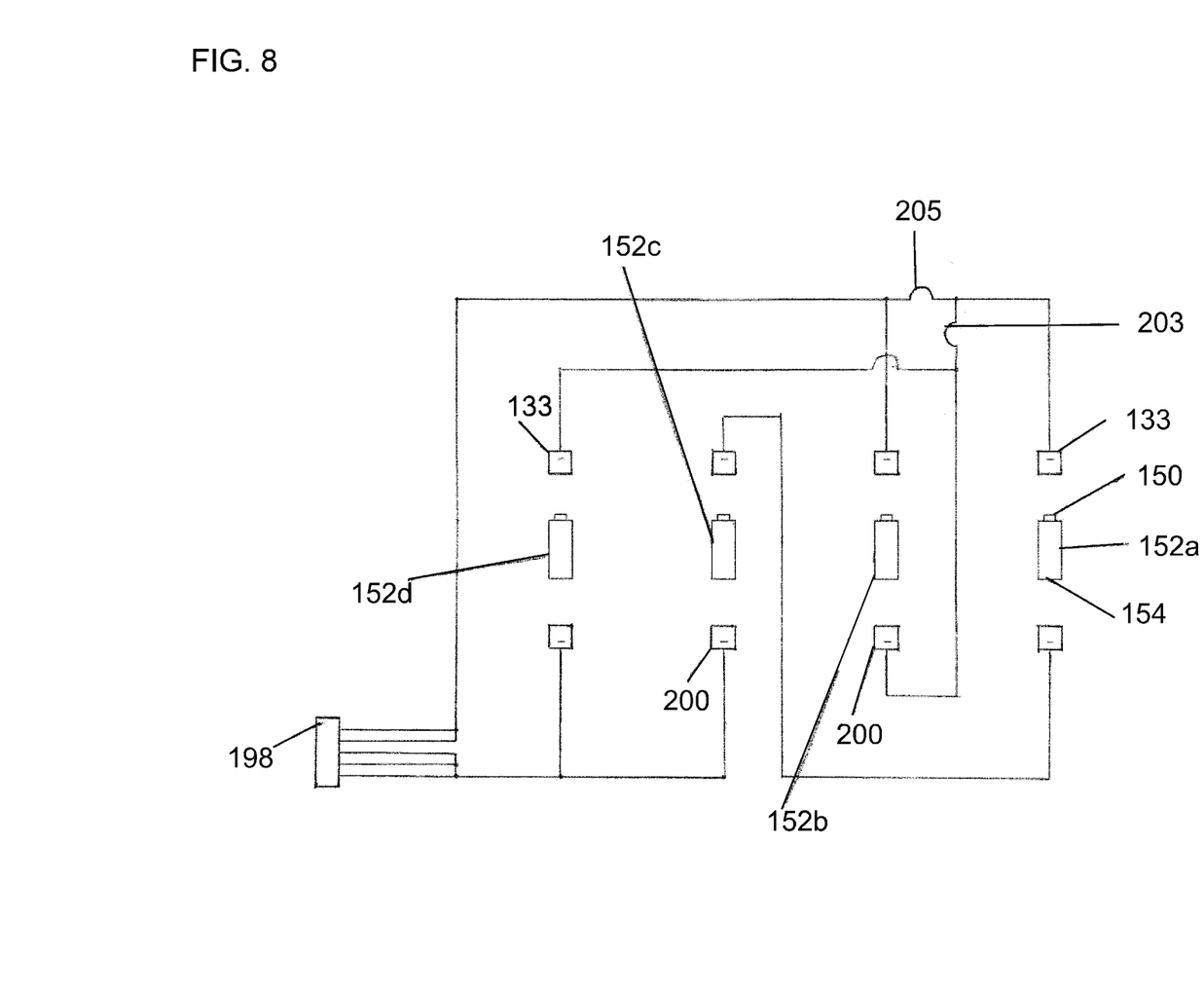
FIGS. 8-10 are exemplary circuit layouts of the battery box.
Figure 9:
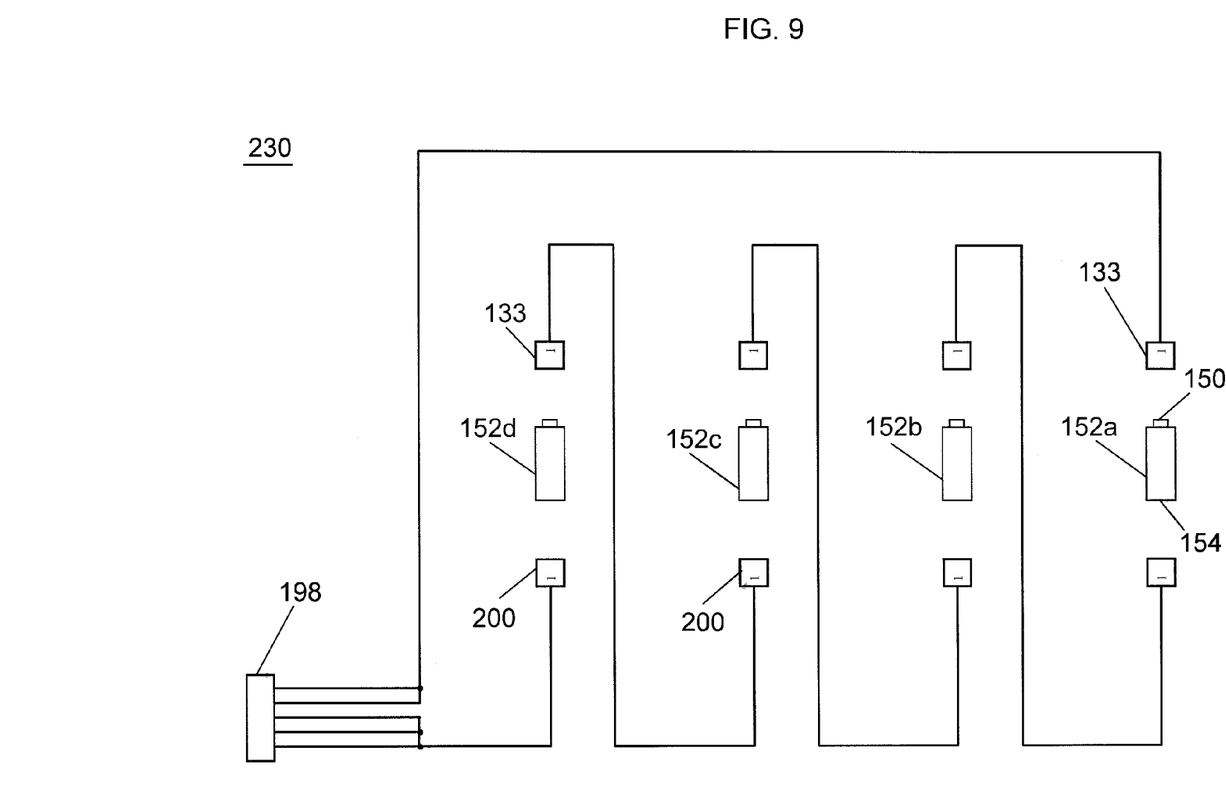
Figure 10:
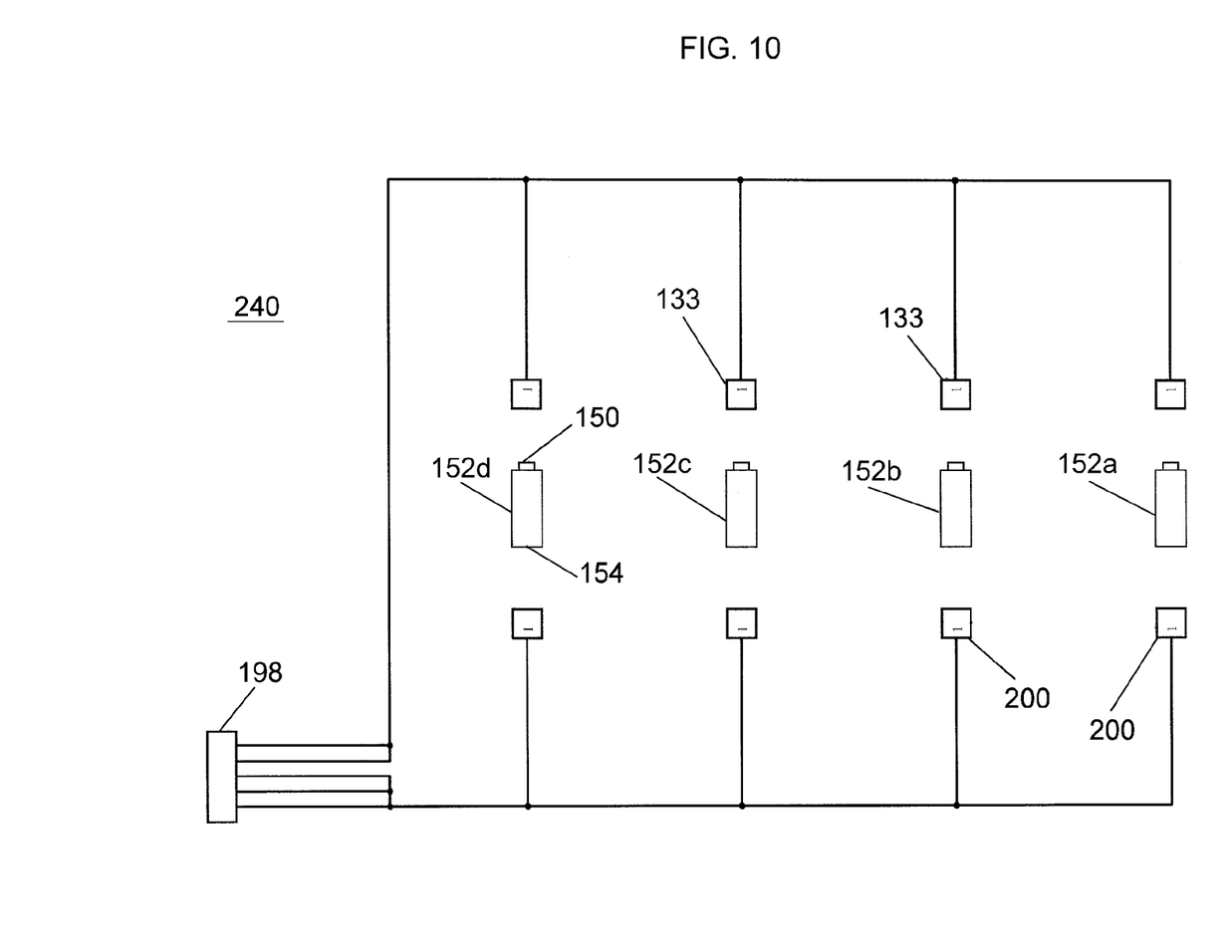

As best seen in FIG. 4, and as schematically illustrated in FIGS. 8-10, and with continued reference to FIGS. 1-3, the flex circuit 140 extends around the interior cavity and includes circuit conductors to electrically couple the positive battery terminals 150 and the negative battery terminals 154 to the mounting shoe contacts 198. In the preferred embodiment, the battery box 100 contains four 1.5 Volt batteries 152. The positive terminals 150 of the batteries 152 pass through the apertures 132 and contact the pads 133 located between the exterior layer 120 and the insulating layer 122. Likewise, the negative terminals 154 contact spring contacts 200 which, in turn, are electrically coupled to the flex circuit 140. The flex circuit 140 extends from the top 106 via the cutout 134 and into the cavity 102. To enable the battery box 100 to be opened and closed, with the flex circuit 140 connected to the top 106 at one end and the spring contacts 188 of the mounting shoe 108 inside the cavity 102 at the other end, the flex circuit 140 may be longer than the distance of its path between the top 106 and the contacts 188 along the wall of the cavity 102. The additional length of the flex circuit 140 fits into the protrusion 130 when the top 106 is closed and secured to the body 104 portion to prevent the flex circuit 140 from being cut, kinked or damaged when the top 106 is in the closed position.

The flex circuit 140 extends around the interior surface of the cavity 102 from the top 106, passing between the conductor springs 200 for coupling the negative terminals 154 of batteries 152 to the circuit 140 and up to the contacts 198 of the mounting shoe 108. The flex circuit 140 is secured to the bottom of the interior surface of the body 104 via a screw 202 or like fastener.

Figure 5:
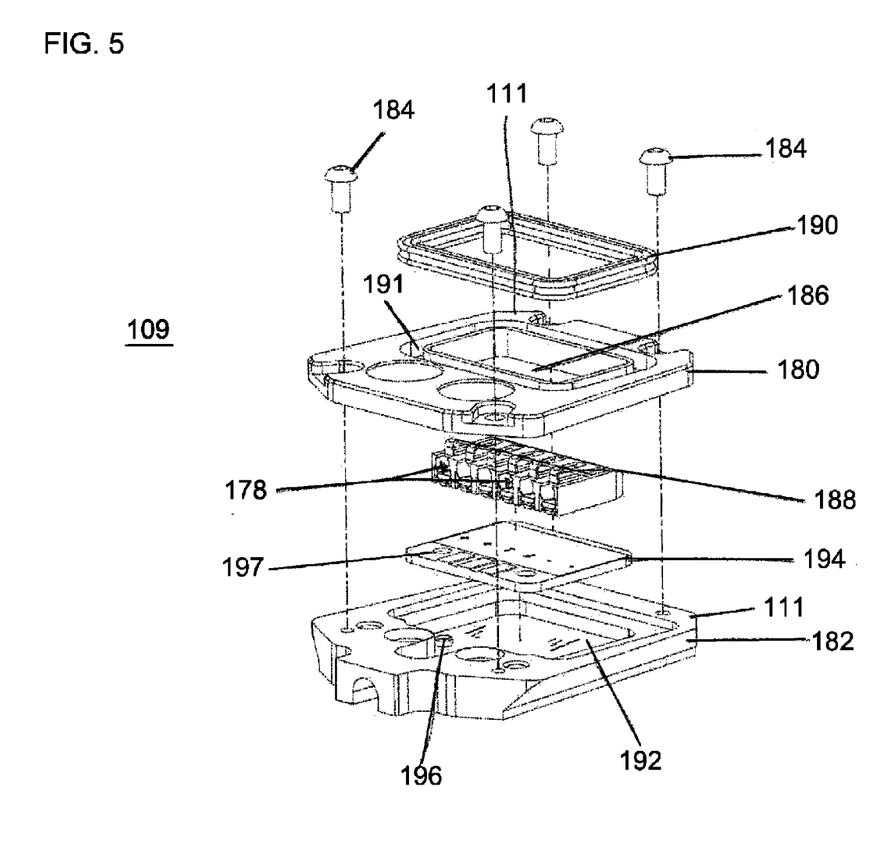
FIG. 5 is an exploded view of a modular mounting foot assembly according to an embodiment of the present invention.
Figure 6:
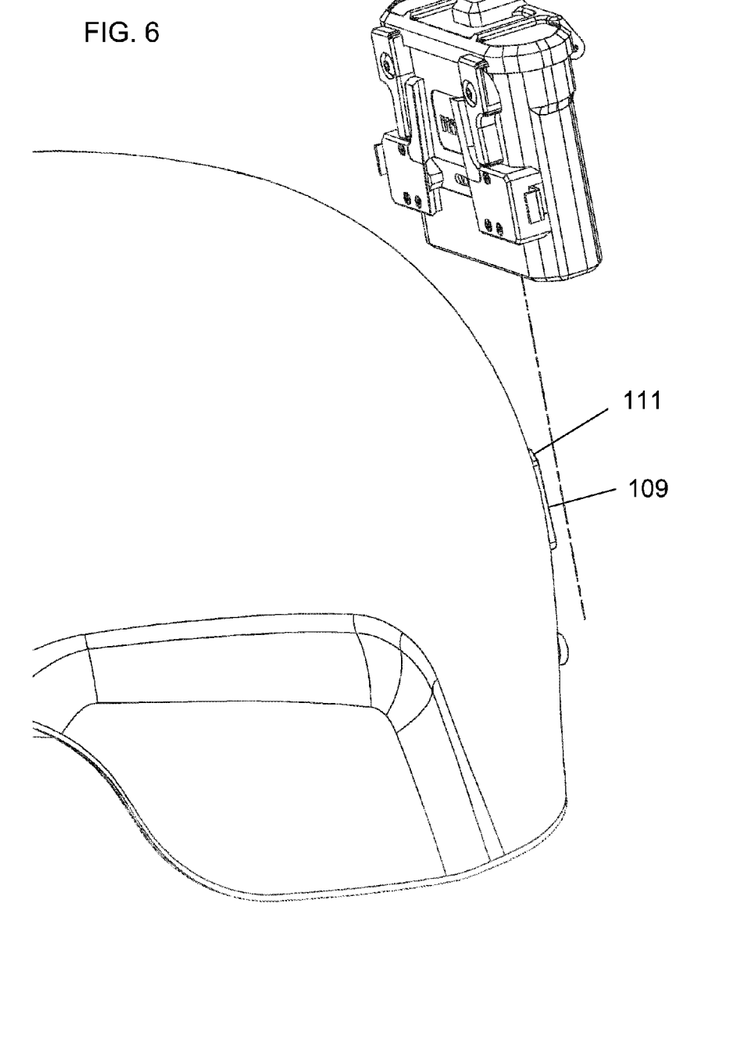
FIG. 6 shows the manner of attachment of the battery box 100 herein to an associated mount.
Figure 7:
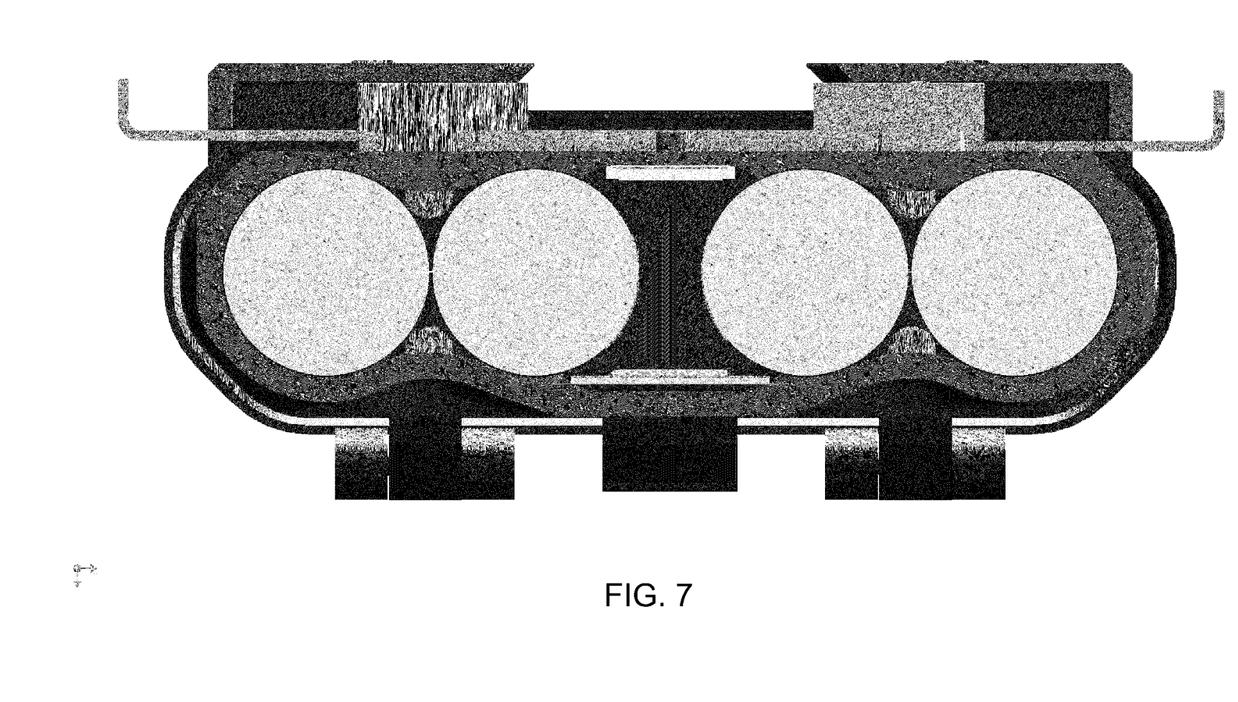
FIG. 7 is a horizontal cross-sectional view of the battery box herein.

Referring now to FIG. 5, there appears the mounting foot 109, which may be integrated into a helmet or other mounting system for connection of the battery box 100 via the mounting shoe 108. The mounting foot 109 includes a first plate 180 and a second plate 182 which are secured via screws or like mechanical fasteners 184. The first plate 180 includes an opening 186 through which spring contacts 188 extend. The spring contacts 188 align with the contacts 198 when the foot 109 is received within the shoe 108. A sealing ring or gasket 190 may be received within groove 191 in the first plate 180 to seal the contacts 188, 198 against moisture or other contamination when the foot 109 is received within the shoe 108.

The second plate 182 includes a cavity 192 for a terminal connection plate 194, and alignment pins 196, which engage alignment openings 197 in the plate 194. The terminal connection plate 194 is electrically coupled to the device to be operated, e.g., via a cable (not shown) pressing through an opening 201 in the second plate 182.

Referring now to FIG. 8, there is illustrated an exemplary embodiment of an electrical circuit 220 configuration for the battery box 100 which is capable of being selectively modified for either three or four battery operation. For four battery operation, circuit location 203 is cut. For three battery operation, circuit location 205 is cut. In this manner a single circuit board pattern or layout can be used for three or four battery location, as desired. Alternatively, dedicated three and four battery circuit layouts can be provided. The depicted circuit layout is exemplary only and other layouts are contemplated.

In the four-battery configuration (i.e., when circuit location 203 is cut), a first pair of batteries 152a, 152c are connected in series. Likewise, a second pair of batteries 152b, 152d are connected in series. The first and second pairs of batteries are, in turn, connected in parallel. In this configuration, employing 1.5V batteries, the battery box 100 provides 3 Volts to a connected device.

Alternatively, the battery box 100 may be used in a three battery configuration, i.e., wherein the circuit portion 205 is cut. In the three-battery configuration, the batteries 152a, 152b, and 152c are connected in series. In the three-battery configuration, the forth battery 152d is omitted. In the three-battery configuration, the battery box 100 provides 4.5 Volts to a connected device.

Referring now to FIG. 9, there appears an exemplary circuit layout 230 wherein the batteries 152a, 152b, 152c, and 152d are connected in series. In this configuration, employing 1.5V batteries, the battery box 100 provides 6 Volts to a connected device.

Referring now to FIG. 10, there appears an exemplary circuit layout 240 wherein the batteries 152a, 152b, 152c, and 152d are connected in parallel. In this configuration, employing 1.5V batteries, the battery box 100 provides 1.5 Volts to a connected device.

It will be recognized that the illustrated electrical circuit configurations are exemplary only and that other electrical circuit configurations, including other numbers of batteries and other series/parallel configurations, etc., may be employed.

The invention has been described with reference to the preferred embodiments. Modifications and alterations will occur to others upon a reading and understanding of the preceding detailed description. Therefore, it is not desired to limit the invention to the specific examples disclosed or the exact construction and operation shown and described. Rather, all suitable modifications and equivalents may be resorted to, falling within the scope of the invention.

Having thus described the preferred embodiments, the invention is now claimed to be:

1. A battery box apparatus, comprising:
    a main body and a cover cooperating to define a battery cavity for removably receiving one or more batteries, said main body having a mounting shoe attached to an exterior side of said main body for removably mounting said battery box apparatus;
    the cover movable between a closed position and an open position and hingedly connected to said main body to selectively close the battery cavity when the cover is in the closed position and to provide access to said battery cavity when the cover is in the open position;
    one or more terminals disposed within the main body for engagement with a first set of one or more battery terminals of the one or more batteries;
    one or more terminals disposed within the cover for engagement with a second set of one or more battery terminals of the one or more batteries;
    a plurality of electrical contacts disposed on said mounting shoe on the exterior side of the main body;
    a locking mechanism for releasably securing said cover in the closed position; and
    a flex circuit received within said battery cavity, said flex circuit comprising a circuit structure carried on a flexible substrate, the circuit structure electrically coupled to said one or more terminals disposed within the main body, the circuit structure further coupled to said one or more terminals disposed within the cover, and the circuit structure further coupled to the plurality of electrical contacts disposed on said mounting shoe on the exterior side of the main body.

2. A battery box apparatus, comprising:
    a main body and a cover cooperating to define a battery cavity for removably receiving one or more batteries, said main body having a mounting shoe attached to an exterior side of said main body for removably mounting said battery box apparatus;
    the cover movable between a closed position and an open position and hingedly connected to said main body to selectively close the battery cavity when the cover is in the closed position and to provide access to said battery cavity when the cover is in the open position;
    one or more terminals disposed within the main body for engagement with a first set of one or more battery terminals of the one or more batteries;
    one or more terminals disposed within the cover for engagement with a second set of one or more battery terminals of the one or more batteries;
    a plurality of electrical contacts disposed on said mounting shoe on the exterior side of the main body;
    a locking mechanism for releasably securing said cover in the closed position; and
    a flex circuit received within said battery cavity, said flex circuit comprising a circuit structure carried on a flexible substrate, the circuit structure electrically coupled to said one or more terminals disposed within the main body, the circuit structure further coupled to said one or more terminals disposed within the cover, and the circuit structure further coupled to the plurality of electrical contacts disposed on said mounting shoe on the exterior side of the main body; and
    a releasable locking assembly for securing said mounting shoe on a complimentary mounting member of a mounting apparatus, wherein said locking assembly includes an alignment pin, two slide tabs with elongated openings that mate with said alignment pin, and two protrusions on said slide tabs resiliently biased to engage said mounting member.

3. A battery box apparatus, comprising:
    a main body and a cover cooperating to define a battery cavity for removably receiving one or more batteries, said main body having a mounting shoe attached to an exterior side of said main body for removably mounting said battery box apparatus;
    the cover movable between a closed position and an open position and hingedly connected to said main body to selectively close the battery cavity when the cover is in the closed position and to provide access to said battery cavity when the cover is in the open position;
    one or more terminals disposed within the main body for engagement with a first set of one or more battery terminals of the one or more batteries;
    one or more terminals disposed within the cover for engagement with a second set of one or more battery terminals of the one or more batteries;
    a plurality of electrical contacts disposed on said mounting shoe on the exterior side of the main body;
    a locking mechanism for releasably securing said cover in the closed position; and
    a flex circuit received within said battery cavity, said flex circuit comprising a circuit structure carried on a flexible substrate, the circuit structure electrically coupled to said one or more terminals disposed within the main body, the circuit structure further coupled to said one or more terminals disposed within the cover, and the circuit structure further coupled to the plurality of electrical contacts disposed on said mounting shoe on the exterior side of the main body; and
    said cover comprising:
        an exterior layer having a pair of releasable tabs that mate with a pair of locking levers of the locking mechanism to releasably secure said top to said main body;
        a cavity formed in the cover for receiving a portion of said flex circuit when said cover is in the closed position;
        an interior layer secured to said exterior layer via one or more mechanical fasteners and sandwiching one or more contact pads between said interior and exterior layers;
        said circuit structure electrically connected to said contact pads; and
        said interior layer having an opening for said flex circuit to exit said cover and a plurality of apertures aligned with said contact pads and sized to allow batteries to pass there through and electrically couple to said contact pads.

4. The battery box of claim 3, wherein said flex circuit is secured to a bottom of said cavity via a mechanical fastener and electrically coupled to one or more contacts on said bottom.

5. The battery box of claim 4, wherein the one or more contacts on said bottom include a plurality of spring contacts and wherein said battery cavity is adapted to receive a plurality of batteries wherein each of the batteries is inserted having its negative terminal down to contact an aligned one of said plurality of spring contacts on said bottom and its positive terminal up to contact an aligned one of said one or more contact pads.

6. The battery box of claim 1, wherein the battery cavity is adapted to receive four batteries.

7. The battery box of claim 6, wherein the flex circuit is adapted to connect the four batteries in parallel.

8. The battery box of claim 6, wherein the flex circuit is adapted to connect the four batteries in series.

9. The battery box of claim 6, wherein the four batteries include a first pair of batteries connected in series and a second pair of batteries connected in series, wherein said first pair is connected in parallel to said second pair.

10. The battery box of claim 1, wherein the battery cavity is adapted to receive three batteries.

11. The battery box of claim 10, wherein the flex circuit is adapted to connect the three batteries in series.

12. The battery box of claim 10, wherein the flex circuit is adapted to connect the three batteries in parallel.

13. The battery box of claim 1, wherein said mounting shoe is adapted for mounting to a mounting apparatus selected from a helmet, a helmet mounted device, a helmet mounting system, an electronically operated device, and an electrically operated device.

14. The battery box of claim 1, further comprising one or more batteries received within said battery cavity.

* * * * *